Nov. 22, 1932.   J. A. VAUGHN   1,888,482
LOCKING AND TRIPPING DEVICE FOR A POWER LIFT IMPLEMENT
Filed Oct. 12, 1931   2 Sheets-Sheet 2
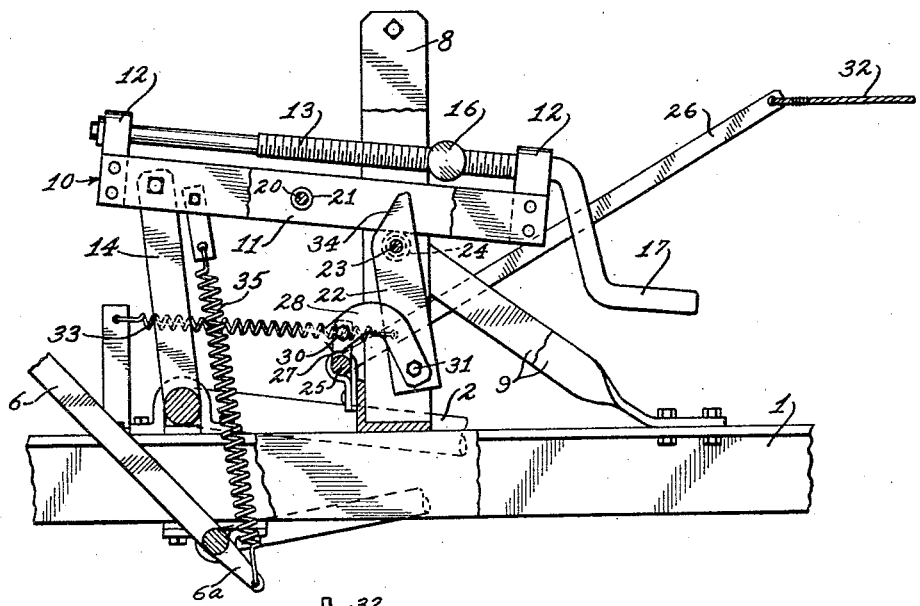
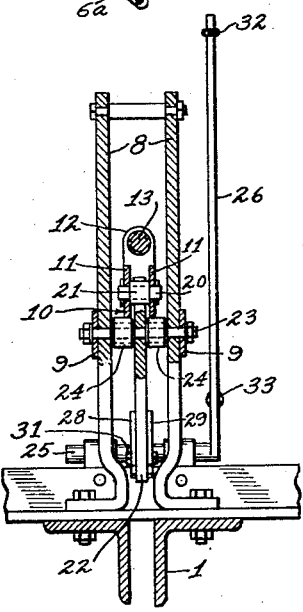
Inventor
Jesse A. Vaughn
By
Attorneys Patented Nov. 22, 1932

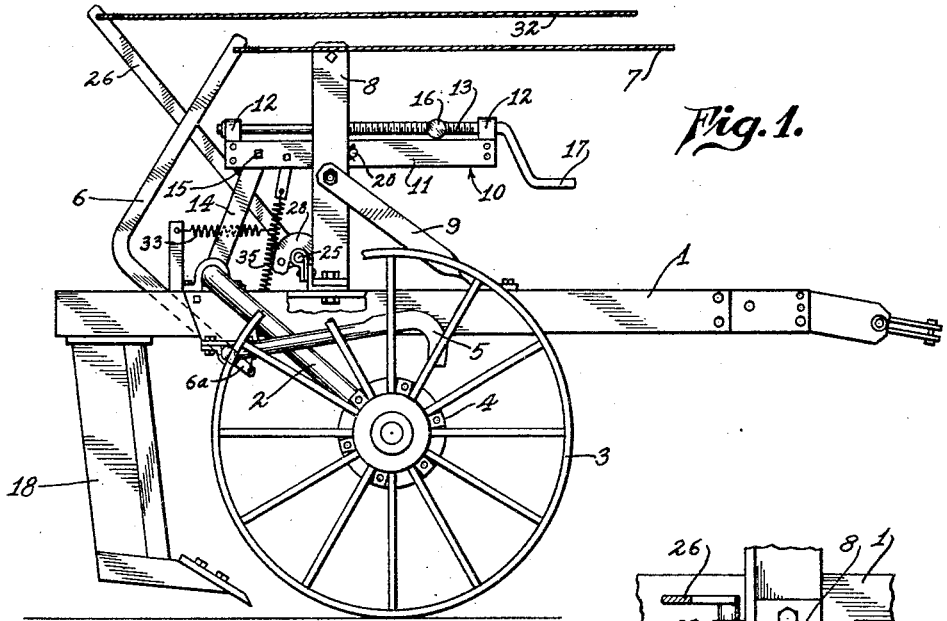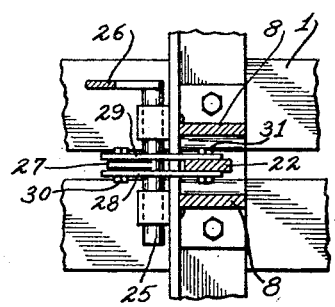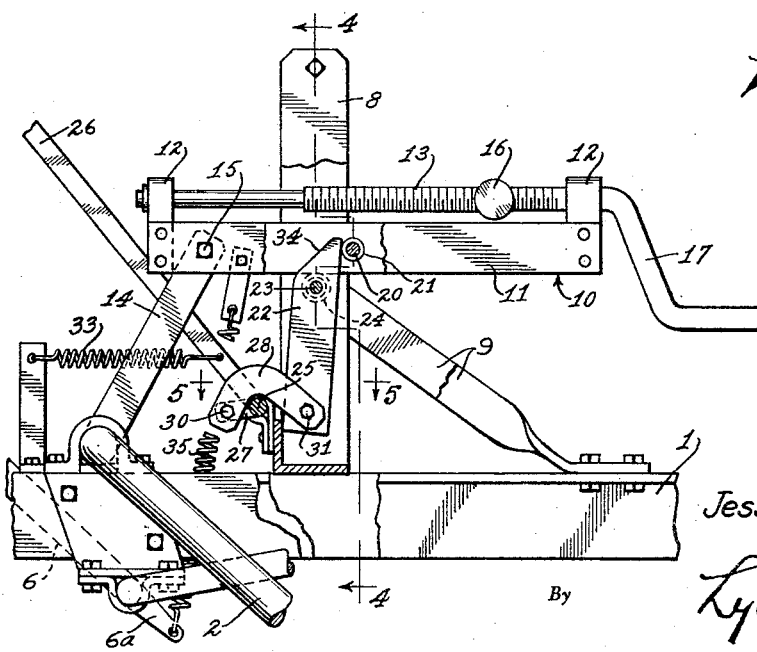
Inventor
Jesse A. Vaughn

1,888,482

UNITED STATES PATENT OFFICE

JESSE A. VAUGHN, OF LOS ANGELES, CALIFORNIA, ASSIGNOR TO KILLEFER MANUFACTURING CORPORATION, LTD., OF LOS ANGELES, CALIFORNIA, A CORPORATION OF CALIFORNIA

LOCKING AND TRIPPING DEVICE FOR A POWER LIFT IMPLEMENT

Application filed October 12, 1931. Serial No. 568,258.

This invention relates to an improved locking and tripping device for a power lift agricultural implement, or the like.

The principal object of this invention is to provide an improved locking and tripping device for a power lift agricultural tool which will securely lock the implement in elevated carrying position, and which may be very easily released to permit the implement to drop, due to gravity, into its operative position.

A further object of this invention is to provide a means for locking the implement in elevated carrying position which means is securely retained in locking position due to a toggle locking effect and arranged whereby the thrust against the locking means caused by the forces of gravity acting to lower the implement into working position will assist the toggle locking effect to more securely retain the implement elevated.

A further object of this invention is to provide a means for locking the implement in elevated carrying position, which locking means is securely retained in locking position due to a toggle locking effect and which means will be self-acting to release the implement from its elevated position when the toggle locking effect has been disrupted.

A further object of this invention is to provide a locking means for retaining a heavy earth working implement in elevated position and so arranged that the weight thereof will assist the locking means in retaining the implement elevated and for utilizing the weight of the implement for actuating the locking means to release the implement from its elevated position when the locking means has been tripped or released.

Anyone who has operated an agricultural implement of the heavy type, readily appreciates the fatiguing effect of continually actuating a trip release lever which offers considerable resistance. It is, therefore, a further object of this invention to provide a tripping device which will lock the implement securely in its elevated position and which, when it is desired to lower the implement into working position will actuate with extreme ease to release the locking means.

Other objects and advantages of this invention will be apparent as the nature of the same is more fully understood from the following description and accompanying drawings, wherein is set forth what is now considered to be a preferred embodiment. It should be understood, however, that this particular embodiment of the invention is chosen principally for the purpose of exemplification, and that variation therefrom in details of construction or arrangement of the parts may accordingly be effected and yet remain within the spirit and scope of the invention as the same is set forth in the appended claims.

In the drawings:

Fig. 1 illustrates a side elevation of an agricultural implement having the invention applied thereto. A portion of the ground wheel has been broken away to more clearly illustrate the tripping device.

Fig. 2 illustrates an enlarged fragmental view, partly in section, of the upper portion of the implement, in which the parts are illustrated in the position they assume when the implement is locked in elevated position.

Fig. 3 illustrates a view similar to Fig. 2, except that the parts are illustrated in the position they assume when the implement has dropped into operative position.

Fig. 4 is a fragmental cross sectional view, taken substantially in the plane indicated by the line 4—4 of Fig. 2, and looking in the direction of the arrows.

Fig. 5 is a fragmental cross sectional view, taken substantially in the plane indicated by the line 5—5 of Fig. 2, and looking in the direction of the arrows.

My improved locking and tripping device may be applied with advantage to any form or type of earth working or carrying tool, such as a plow, cultivator, harrow, scraper, or the like. For the purpose of illustration, I have shown my invention as applied to that form of agricultural implement illustrated and described in the patent to A. W. Hudson, No. 1,710,222, dated April 22, 1929, which form of implement is commonly referred to as a subsoil plow.

In Fig. 1 my invention is applied to a subsoil plow which includes, briefly, a frame 1, having a crank axle 2 journaled transverse thereof. Journaled upon the opposite ends of the crank axle are road wheels 3, each carrying a trundle or ratchet wheel 4 which is adapted to be engaged by hooks or pawls 5. The pawls 5 are journaled upon the frame and are provided with an actuating lever 6 which may be provided with a rope 7 for ease of operation. An upstanding standard 8 is mounted upon the frame and braced thereto by means of the brace members 9. Slidably mounted through standard 8 is the sliding control bar 10 which preferably includes two spaced parallel bars 11 (note Fig. 4) having secured at each end thereof bearing blocks 12 through which is journaled the threaded adjusting rod 13. The crank axle 2 carries a crank arm 14 which at its upper end is pivotally mounted to the sliding control bar 10 adjacent the rear end thereof by means of the bolt 15. By this arrangement, as the crank axle rotates with relation to the frame, the control bar 10 is caused to slide through standard 8. By placing appropriate stops upon the control bar, the travel thereof, and thereby the relative rotation of the crank axle, can be controlled. It is preferable to make one of the stops adjustable in order to govern the depth to which the earth working tools are to be lowered into the soil. For this purpose, the threaded adjusting rod 13 is provided with an elongated stop nut 16 adapted to engage the standard when the implement has dropped to the desired position. To adjust the location of the stop nut 16 the adjusting rod is rotated by means of crank handle 17.

At any suitable locality upon the frame, may be located appropriate earth working tools 18. At times it is desirable to elevate the tools 18 above the ground and to maintain the tools in elevated position, a locking means is provided which engages and holds the control bar from sliding rearward. As will be appreciated, a rearward movement of the control bar would permit the crank axle to rotate, thereby lowering the frame with relation to the wheels, so that the tools which are carried thereby would return into working relation with the ground.

The locking means for retaining the control bar in its forward position may include, as most clearly illustrated in Figs. 2 and 4, a stop pin 20 carried by the bars 11. An antifriction roller 21 may be journaled upon the stop pin 20 between the bars 11 to render the releasing of the locking means with more ease and surety and also to prevent excessive wear to the stop pin.

A latch 22 is pivotally mounted upon standard 8 by means of shaft 23.

By referring to Fig. 4, it will be observed that the shaft may be also utilized for connecting the upper ends of the brace members 9 to the standard 8 and also by means of antifriction rollers 24 to slidingly support the control bar 10. The upper end of latch 22 is positioned to engage and retain the roller 21 and through stop pin 20 to lock the control bar in the position illustrated in Figs. 1 and 2. The latch 22 is pivotally mounted upon the standard and would swing to release the control bar if not retained from doing so by suitable tripping or release means. A trip control shaft 25 is journaled upon frame 1 adjacent the rear of standard 8 and is provided with a releasing lever 26. The trip control shaft 25 is provided with a rearwardly extending crank arm 27, the outer end of which is operatively connected to the lower end of the latch by means of arcuate links 28 and 29. One end of the arcuate links is pivotally connected to the crank arm 27 by pivot bolt 30, while the other end thereof is pivotally connected to the lower end of the latch lever by pivot bolt 31.

It is important to arrange the pivots 30 and 31 so that any tendency of the lower end of the latch lever to swing forwardly will act to rotate the shaft 25 in a counterclockwise direction (note Fig. 2), so as to more securely lock the latch against releasing the control bar. Any form of suitable stop means may be provided to limit the counter-clockwise rotation of crank arm 27 so as to prevent the locking latch 22 from swinging to a releasing position.

As illustrated in Fig. 2, the arcuate portion of the links 28 and 29 abut against the crank shaft 25 when the crank arm has fallen sufficiently below the center of the crankshaft so that the force exerted against the latch will act through the links to hold the links in abutting engagement with crankshaft 25, thus forming a toggle locking effect.

When it is desired to release the implement from its elevated position to lower the tool carried thereby into operative relation with the ground, the trip-releasing lever 26 is swung forward by means of trip rope 32. The release lever will swing easily even though a large implement of a heavy type is being operated for the reason that the operator need only disrupt the toggle locking effect formed by the crank arm 27, lines 28 and 29, and the latch 22, and the weight of the implement will act to complete the releasing action. In other words, the release of the locking means is self-acting once the toggle effect is disrupted.

Due to the tremendous leverage of the releasing lever 26 as compared to the relatively small travel necessary to swing the crank arm 27 to a position where the force of the weight of the implement will actuate the release, it requires only a very light pull upon the trip rope to disrupt the toggle locking effect, and the balance of the motion to effect the release of the control bar is obtained automatically by the weight of the implement.

The implement may be elevated as fully described in the previously mentioned patent to A. H. Hudson, by swinging the hooks 5 to engage the trundle wheels 4 and when the implement is elevated to the predetermined elevation, the hooks are automatically disengaged from the trundle wheels to stop further lifting thereof. Slightly before the lifting means release, it is desirable to lock the implement in its elevated position, which locking is accomplished by having the latch 22 returned to its initial position after unlocking the control bar by means of spring 33, suitably connecting the frame and release lever 26 (note Figs. 2 and 3). As will be observed from the drawings, the rear face of the latch lever 22, adjacent the upper end thereof, is inclined as at 34 to enable the roller 21 to ride thereon to lift the control bar over the end of the latch lever 22 and it is shortly after the roller 21 passed over the upper end of the latch lever that the elevating means is automatically disconnected and if it were not for the stop roller 21 engaging the forward face of the latch the implement would return to its operative position.

To aid the control bar in dropping into locking position, a spring 35 is provided. It is also desirable to return the hooks 5 to their inactive position when automatically released from the trundle wheels and therefore spring 35 is connected at one end to a forwardly extending portion 6a of the elevating lever 6 while the other end of spring 35 is suitably connected to the control bar, and thus spring 35 is utilized for a dual purpose.

While I have illustrated the preferred form of my invention, it is to be understood that the foregoing description is for illustrative purposes only, and I do not desire to be limited by any of the details shown or described, except as defined in the appended claims.

I claim:

1. A lock and release device for an earth working implement of the lift type including a sliding control bar, a latch means for locking said bar, a toggle means for retaining said latch in locking position, and a release means operable for actuating said toggle means to release said latch means for unlocking said control bar.

2. A lock and release device for an earth working implement of the lift type including, a sliding control bar, a latch means for locking said bar, a toggle means for retaining said latch in locking position, and a release means operable for actuating said toggle means to release said latch for unlocking said control bar, and a spring means for returning said latch to locking position.

3. A lock and release device for an earth working implement of the lift type including, a sliding control bar, a stop carried thereby, a latch, adapted to engage said stop for locking said bar, a link pivoted to said latch, a crank arm pivoted to said link and adapted to form a toggle lock therewith for retaining said latch in locking position, and means for rotating said crank arm for disrupting said toggle locking effect and for actuating said latch to unlock said control bar.

4. A lock and release device for an earth working implement of the lift type including, a sliding control bar, a stop carried thereby, a latch adapted to engage said stop for locking said bar, a link pivoted to said latch, a crank arm pivoted to said link and adapted to form a toggle lock therewith for retaining said latch in locking position, means for rotating said crank arm for disrupting said toggle locking effect and for actuating said latch to unlock said control bar, and spring means for returning said latch to locking position.

5. A lock and release device for an earth working implement of the lift type including, a sliding control bar, a stop carried thereby, a pivoted latch having one end adapted to engage said stop, a link pivoted to the other end of said latch, a crank arm pivotally connected to said link and adapted to form a toggle lock therewith for retaining said latch in locking position, and means for rotating said crank arm for disrupting said toggle locking effect and for actuating said latch to unlatch said control bar.

6. A lock and release device for an earth working implement of the lift type including a sliding control bar, a stop carried thereby, a pivoted latch having one end adapted to engage said stop, a link pivoted to the other end of said latch, a crank arm pivotally connected to said link and adapted to form a toggle lock therewith for retaining said latch in locking position, means for rotating said crank arm for disrupting said toggle locking effect and for actuating said latch to unlock said control bar, and a spring means for returning said latch to locking position.

Signed at Los Angeles, California, this 3rd day of October, 1931.

JESSE A. VAUGHN.